(12) United States Patent
Wise

(10) Patent No.: US 6,252,164 B1
(45) Date of Patent: Jun. 26, 2001

(54) UTILITY LINE COUPLING PROTECTOR

(76) Inventor: Eric P. Wise, 41 Adams Way, Adairsville, GA (US) 30103

( * ) Notice: Subject to any disclaimer, the term of this patent is extended or adjusted under 35 U.S.C. 154(b) by 0 days.

(21) Appl. No.: 09/390,437

(22) Filed: Sep. 7, 1999

(51) Int. Cl.[7] .................................................. H02G 3/22
(52) U.S. Cl. .......................... 174/50; 174/65 R; 174/48; 174/66; 104/275
(58) Field of Search .............................. 174/48, 52.1, 66, 174/68.1, 68.3, 70 C, 70 R, 72 C, 97, 50, 65 R; 220/241, 3.8; 248/49; 104/275; 439/369

(56) References Cited

U.S. PATENT DOCUMENTS

| | | | |
|---|---|---|---|
| 90,336 | * 5/1869 | Bellany .................. | 104/275 |
| 2,166,031 | * 7/1939 | Wendell .................. | 104/275 |
| 2,166,516 | * 7/1939 | Bainbridge ............. | 104/275 |
| 2,299,356 | * 10/1942 | Strohm et al. .......... | 104/275 |
| 2,391,409 | * 12/1945 | Geist et al. ............. | 248/49 |
| 3,357,370 | * 12/1967 | Walkey .................. | 104/275 |
| 3,888,186 | * 6/1975 | Jentzsch et al. ........ | 104/275 |
| 4,067,258 | * 1/1978 | Valeri .................... | 104/275 |
| 4,101,100 | * 7/1978 | Smith et al. ............ | 104/275 |
| 4,615,543 | 10/1986 | Cannon . | |
| 4,741,559 | 5/1988 | Berghman . | |
| 4,784,612 | 11/1988 | Ryan . | |
| 4,884,979 | 12/1989 | Budner . | |
| 4,930,543 | 6/1990 | Zuiches . | |
| 4,940,424 | 7/1990 | Odbert . | |
| 4,998,891 | 3/1991 | Bresko . | |
| 5,095,822 | * 3/1992 | Martin .................... | 104/275 |
| 5,129,839 | 7/1992 | VanSkiver . | |
| 5,135,409 | 8/1992 | Thompson . | |
| 5,217,387 | 6/1993 | Hull et al. . | |
| 5,259,782 | 11/1993 | Giffin . | |
| 5,273,454 | 12/1993 | Shotey . | |
| 5,299,951 | 4/1994 | Blaetz . | |
| 5,306,176 | 4/1994 | Coffey . | |
| 5,505,634 | 4/1996 | Osten . | |
| 5,527,071 | 6/1996 | Briggs . | |
| 5,551,888 | 9/1996 | Rhodes, Sr. . | |
| 5,566,622 | * 10/1996 | Ziaylek, Jr. et al. .... | 174/72 C |
| 5,755,588 | 5/1998 | Sweatman et al. . | |
| 5,772,462 | 6/1998 | Osten . | |
| 5,813,879 | 9/1998 | Russo . | |
| 5,816,622 | 10/1998 | Carter . | |
| 5,834,690 | 11/1998 | Bastiaansen . | |
| 6,056,580 | * 5/2000 | Cross et al. ............. | 439/369 |
| 6,067,681 | * 5/2000 | Zeinstra ................. | 104/275 |
| 6,080,004 | * 6/2000 | Kovacik et al. ........ | 439/369 |
| 6,133,524 | * 10/2000 | Bosse, Jr. ............... | 174/48 |

\* cited by examiner

*Primary Examiner*—Dean A. Reichard
*Assistant Examiner*—Angel R. Estrada
(74) *Attorney, Agent, or Firm*—Hughes & Kaplan; Barry E. Kaplan, Esq.

(57) ABSTRACT

The present invention provides a rigid and partially hollow dome-shaped utility line coupling protector having first and second apertures for the insertion and removal of the male and female ends of a utility line. An optionally recessed bottom cover is provided as a seal against fluids and debris. An adjustable aperture adapter cap having a plurality of perforated, nested sections is carried within each aperture in order to accommodate various sized utility lines and, further, to provide a fluid and debris-resistant barrier. In order to prevent horizontal movement of the coupling and its accidental disconnection, a first and second coupling stop, and a plurality of ways dimensioned for receiving generally inverted U-shaped washers are provided. Downwardly extending projections formed on the bottom of the device engage the ground to prevent movement of the device during use. Through-holes for receiving nails, stakes, or the like are formed on the device for further securing said device to the ground. Because the device is intended to be driven over without causing ensuing damage to the coupling contained therein, a plurality of radial grooves are formed on the exterior of the device to prevent slippage of a vehicle's tire.

29 Claims, 3 Drawing Sheets

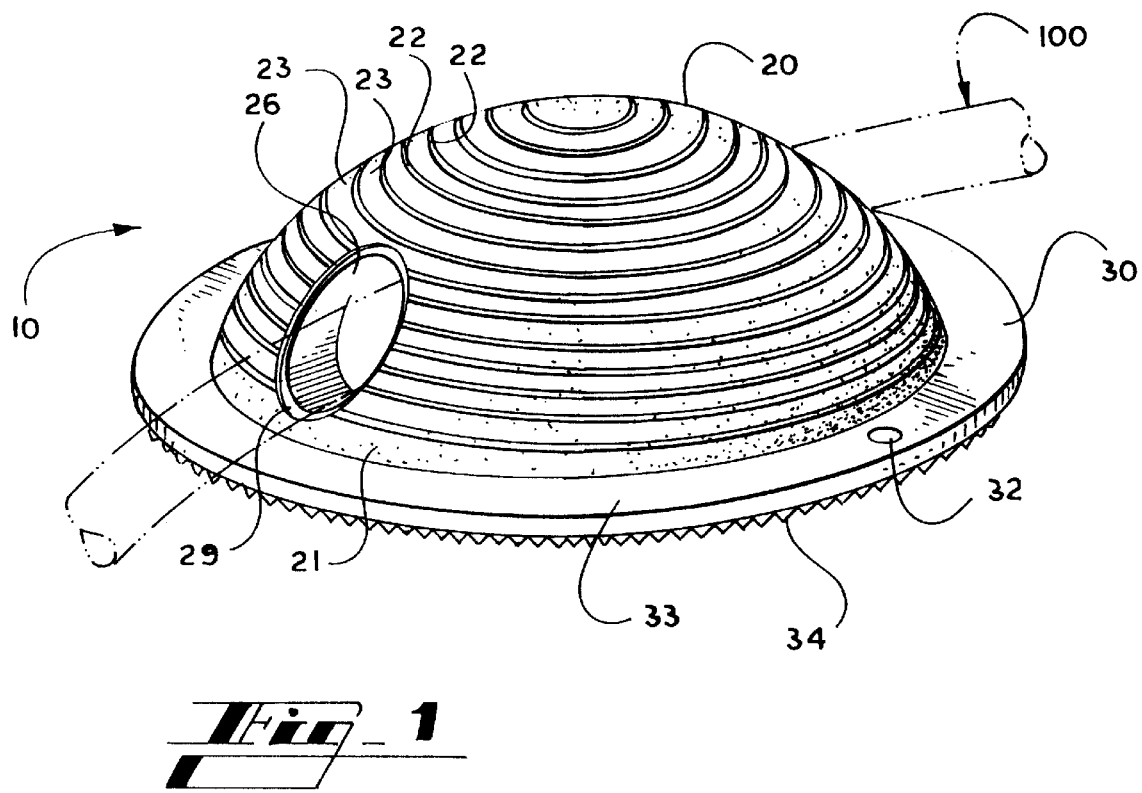
Fig_1
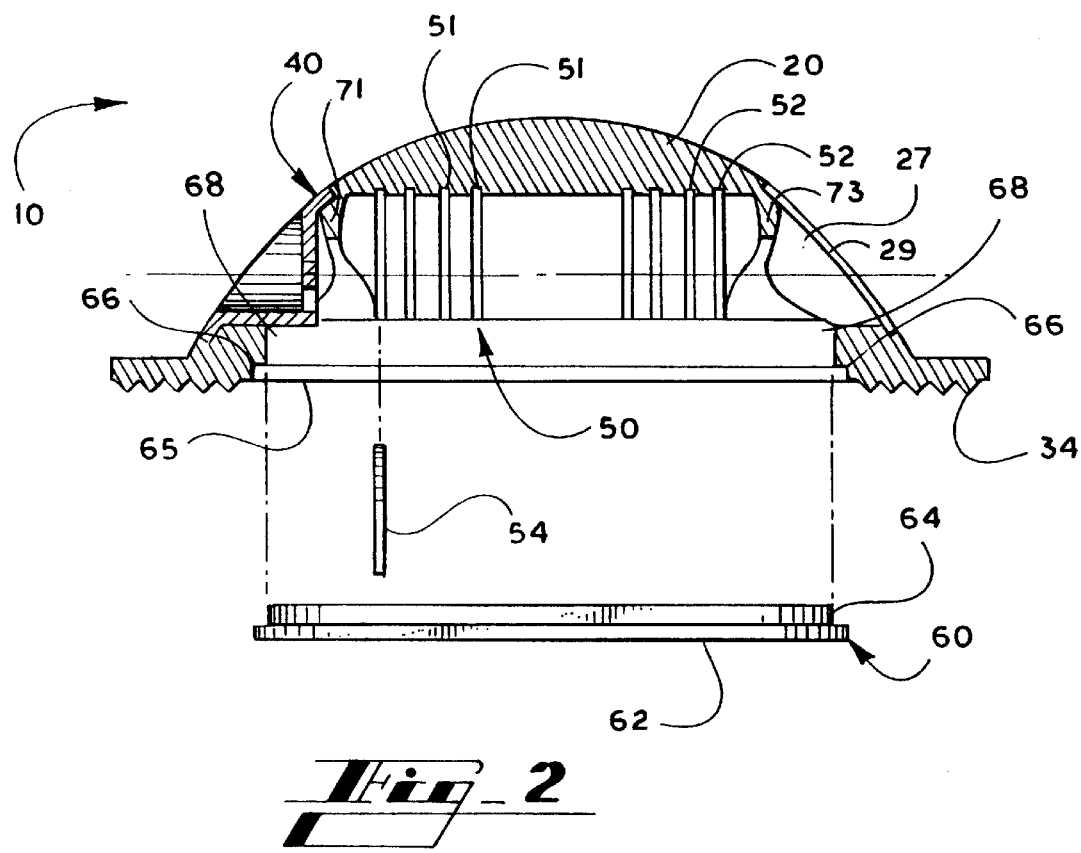
Fig_2

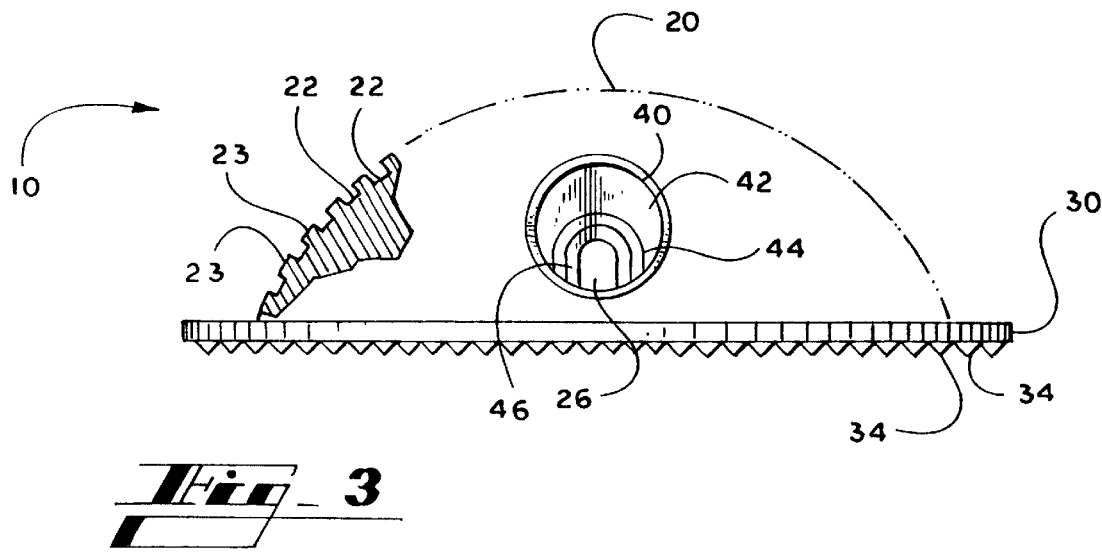
Fig_3
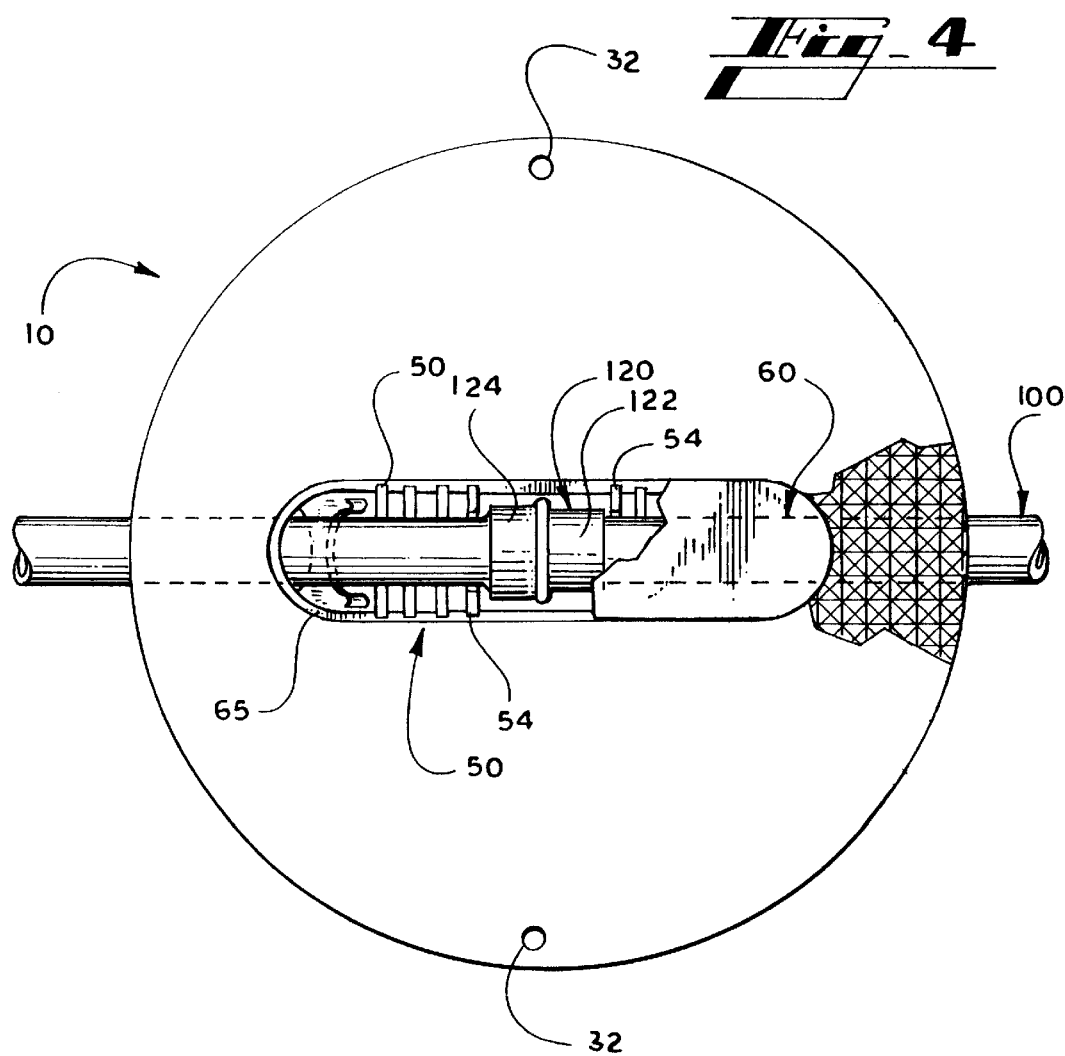
Fig_4

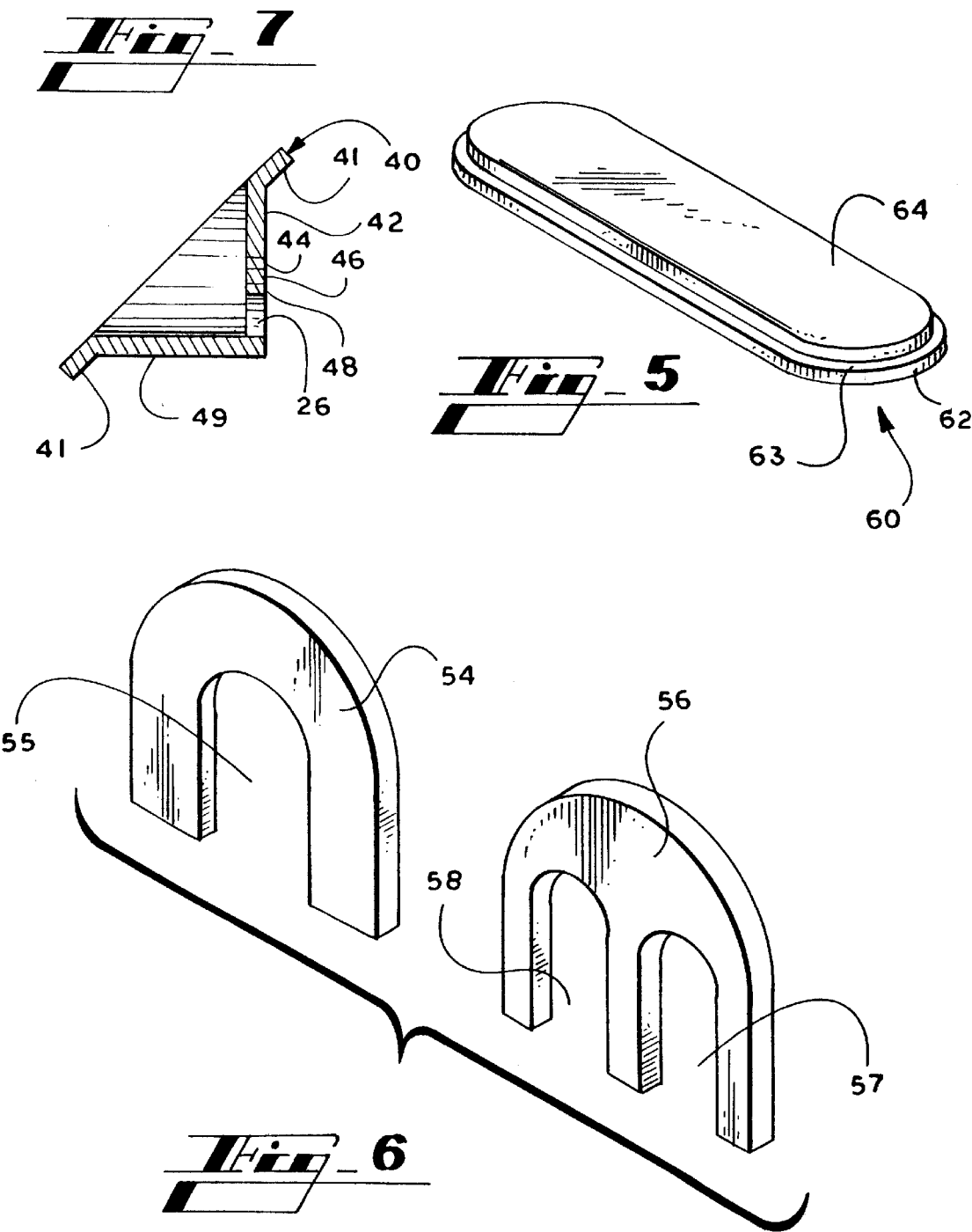

UTILITY LINE COUPLING PROTECTOR

TECHNICAL FIELD

The present invention relates generally to protectors, and, more specifically, to utility line coupling protectors.

BACKGROUND ART

In many settings, such as construction sites, fair grounds, sporting events, and other outdoor affairs, and, additionally, with some indoor events such as festivals, conventions, boat shows, automobile shows, circuses, and the like, numerous temporary utility lines are typically placed on top of the ground or other surface to provide water, electricity, fuel, telephone, coaxial cable, fiber optic cable, and other required utilities or services. In these same settings, however, vehicles, and often heavy machinery, are in transit through the area. Because these vehicles typically must cross over the utility lines, damage often results to the lines, and utility service is interrupted. Such interruptions are sometimes merely inconvenient, sometimes dangerous, and usually costly. Sometimes the source of the interruption may be difficult or time consuming to locate and repair.

The hoses, piping, cabling, or wiring by which the utilities or services are transported are often sufficiently flexible or rigid to support the weight of a vehicle. The coupling, commonly comprising a male and female fitting, between two or more lines, however, is the area typically damaged by a vehicle. For instance, hoses for providing water are typically flexible enough when unpressurized and rigid enough when pressurized to withstand the weight of a vehicle. The coupling connecting two or more hoses, on the other hand, is often manufactured from a relatively weak metal that is not designed to withstand the weight of a vehicle. As a result, the coupling is usually damaged when the vehicle rolls over the coupling.

A thus damaged coupling prevents proper operation of the hose and, consequently, delay and costly replacement of both the hose and its couplings frequently results. With most utility lines, it is too time consuming to attempt a repair or replacement of a damaged coupling, and as such, damage to a coupling often results in the entire replacement of at least two utility lines. Couplings of other utility or service lines, such as electrical extension cords and cabling, often suffer the same fate when a vehicle is driven over the coupling portions.

In addition to damaged couplings, the repetitious travel of vehicles over the utility line frequently causes movement of the line. Such movement may result in the unintentional and undesired disconnection of the utility line, either at the coupling or at the source. Moreover, this movement of the utility line may increase wear and tear of the line; thus, sometimes requiring premature replacement of the line.

As a make-shift attempt to avoid these problems, a variety of often inadequate solutions sometimes are contrived. For instance, the coupling may be placed upon a barrel, or other raised object, and weighted down by rocks, bricks, or the like, so that the driver of a vehicle might more easily see the raised coupling; and, thus, might avoid driving over the coupling. Such a solution, however, not only can limit the driving area for the vehicle, it can also create additional safety concerns. With the coupling so raised from the ground, the utility line proximate to the coupling also is raised; thereby, creating a trip hazard for individuals in the area, in addition to creating a possible entanglement hazard with the vehicle's tires or axle should the vehicle pass too closely to the raised coupling. Often, however, a driver or machinery operator simply does not see the raised coupling in time to avoid collision with the make-shift coupling stand.

As an alternative, the coupling may remain on the ground or other surface with two wooden boards placed on either side of the coupling and parallel with the utility line. An additional board is sometimes utilized to join each parallel board, in an attempt to limit movement of the boards relative to the coupling. The theory is that when a vehicle travels over the coupling, the boards will carry a majority of the vehicle's weight. Because this primitive design often becomes disassembled and moved during use, it, too, may fail adequately to prevent coupling damage.

In a further attempt to prevent or reduce the above-discussed incidents of coupling damage and disconnection, numerous other solutions have been proposed in the patent prior art. Examples of designs toward the solution of the above-referenced problems may be found by reference to U.S. Pat. No. 5,834,690 to Bartiaansen, U.S. Pat. No. 5,816,622 to Carter, U.S. Pat. No. 5,813,879 to Russo, U.S. Pat. No. 5,772,462 to Osten, U.S. Pat. No. 5,755,588 to Sweatmen et al., U.S. Pat. No. 5,551,888 to Rhodes, Sr., U.S. Pat. No. 5,527,071 to Briggs, U.S. Pat. No. 5,505,634 to Osten, U.S. Pat. No. 5,306,176 to Coffey, U.S. Pat. No. 5,299,951 to Blaetz, U.S. Pat. No. 5,273,454 to Shotey, U.S. Pat. No. 5,259,782 to Giffin, U.S. Pat. No. 5,217,387 to Hull et al., U.S. Pat. No. 5,135,409 to Thompson, U.S. Pat. No. 5,129,839 to VanSkiver, U.S. Pat. No. 4,998,891 to Bresko, U.S. Pat. No. 4,940,424 to Odbert, U.S. Pat. No. 4,930,543 to Zuiches, U.S. Pat. No. 4,884,979 to Budner, U.S. Pat. No. 4,784,612 to Ryan, U.S. Pat. No. 4,741,559 to Berghman and U.S. Pat. No. 4,615,543 to Cannon. In light of the present invention, however, these prior art designs are disadvantageous for a variety of reasons.

Many of the above-referenced designs, for instance, fail adequately to secure the protector into a fixed position relative to the ground or other surface. Additionally, some designs do not sufficiently prevent horizontal movement of the utility line or coupling to avoid inadvertent disconnection. Of the designs that may limit horizontal movement, most are not easily adjustable to accommodate the variety of sizes of utility lines and couplings typically found in the above-described settings.

Moreover, none of the heretofore mentioned designs are seen to be intended to carry the full weight of a vehicle without crushing both the utility line coupling protector itself and the couplings contained therein.

It is readily apparent that a new and improved utility line coupling protector is needed that can protect a coupling from damage by machinery or vehicles, and, further, that can adequately prevent accidental disconnection of the coupling. It is, therefore, to the provision of such an improved utility line coupling protector that the present invention is directed.

BRIEF SUMMARY OF THE INVENTION

Briefly described, in a preferred embodiment, the present invention both overcomes the above-mentioned disadvantages, and meets the recognized needs for such a device, by providing a utility line coupling protector that not only protects the coupling from the weight of machinery and vehicles, but that also adequately secures the coupling in a fixed position relative to the ground or other surface to prevent accidental disconnection and unnecessary wear and tear.

More specifically, in a preferred embodiment, the present invention comprises a rigid dome-shaped outer portion, a base, and a bottom cover. The dome portion includes a substantially hollow channel traversing therethrough and, further, having first and second apertures penetrating the dome at radially opposite sides. Each aperture serves as an opening for the insertion and removal of utility lines such as hoses, extension cords, and the like.

The base is preferably a circular member either integrally formed with, or attached to, the bottom of the dome portion for generally stabilizing the dome portion and for providing a means for removably securing the device into a fixed position. The diameter of the base may be larger than the bottom diameter of the dome; thus, in such configuration, the base further comprises a flange area circumscribing the base about the dome.

To provide access to the substantially hollow channel traversing through the internal portion of the dome, an elongated access area is cutout or formed proximate to the center of the base. A bottom cover is provided that, preferably, is dimensioned for snugly fitting within the elongated access area. The purpose of the bottom cover is to shield the internal portion of the dome from deleterious fluids, rocks, pebbles, grass, and the like.

To provide means for preventing excess horizontal movement of the utility line coupling within the dome, and for further preventing the coupling from being inadvertently withdrawn or removed from the dome, first and second coupling stops are provided within the substantially hollow channel and proximate to respective first and second apertures. The coupling stops comprise generally inverted U-shaped structures which may be integrally formed within the dome. The coupling stops depend downwardly and about the channel, and may be centrally slanted, in order to adequately capture the coupling within the channel and to prevent unintentional extraction therefrom.

To provide further and additional means for preventing horizontal movement of the utility line coupling, a plurality of inverted U-shaped ways may be formed on the interior of the dome portion, adjacent the channel and on each side of the coupling area. A plurality of inverted U-shaped washers are provided, each dimensioned for slidably engaging one of the ways. The opening of each washer is dimensioned for receiving a utility line; yet, is smaller than the size of the coupling. Thus, in use, depending upon the length of the coupling, a washer is engaged on each side of the center area within the channel and, further, within the ways that are in closest proximity to the coupling ends.

Thus, with a view to limiting the horizontal movement of the coupling, the male and female utility line couplings are inserted into the opposing apertures of the device. The lines are extended sufficiently within and through the dome to clear the base of the device by flexing the lines outwardly past each coupling stop and past each washer. Then, the couplings are joined together. The lines are then withdrawn such that the joined coupling may be inserted into the channel between the respective washers. In such assemblage, the washers rest against, or are in close proximity to, the coupling; thus, preventing or limiting any horizontal movement of the coupling and inhibiting accidental disconnection of the joined lines.

To prevent movement of the device relative to the ground surface or other underlying surface, a plurality of preferably pyramidal-shaped projections optionally may be provided to extend downwardly from the bottom of the base for engaging the ground surface. As a further means of securing the device into a fixed position, through-holes are formed on the flange area of the base for receiving nails, stakes, or the like, that extend through the base and into the ground or other underlying surface.

Because the device of the present invention may be driven over by a vehicle without crushing, it is advantageous to provide a tire gripping means to the exterior of the dome to assist the rolling of vehicle tires over the dome. A plurality of vertically-spaced-apart radial grooves, or equivalent, may be formed on the exterior of the dome, preferably such that the entire exterior surface of the dome consists of alternating radial grooves and radial teeth. As a vehicle tire contacts the dome, the radial teeth are engaged by the tire; thus, preventing the slipping of the tire as it rolls over the dome.

To protect an electrical coupling from water exposure, the internal portion of the dome of the present invention is designed to be water resistant. In addition to the water tight fit of the bottom cover, first and second adjustable aperture adapter caps are provided. Each adjustable aperture adapter cap preferably is manufactured from a flexible water resistant material, such as rubber or the like. The aperture adapter caps are made to conform to the surface shape of the dome, so that they fit snugly thereagainst. Each aperture adapter cap is dimensioned to be received within an aperture, and can be adjusted to snugly fit around the utility line. In this manner, water and other deleterious liquids are impeded from entry into the internal portion of the dome.

The adjustable aperture adapter cap reduces the size of the aperture to a relatively small, inverted U-shaped opening. A plurality of partially severed or perforated inverted U-shaped portions are provided at various positions along the central vertical diameter of the aperture adapter cap such that, depending upon the diameter of the utility line, the appropriate perforated portion may be torn away and removed. The aperture adapter cap, so configured, provides an opening having an equal or slightly smaller width than the diameter of the utility line; therefore, the aperture adapter cap rests snugly against the utility line and serves to block the entry of fluids into the dome and channel.

The dome may be provided in a highly visible color, such as brilliant orange or yellow, and additionally with light reflective means, in order to provide enhanced visibility of the device, during both day and night, to a vehicle or machinery driver.

Thus, among the several objectives, features, and advantages of the present invention are provided a new and improved utility line coupling protector that is dome-shaped and that will structurally support substantial weight so that vehicles and machinery can easily roll over the device without crushing either the utility line coupling protector itself or the couplings contained therein;

a new and improved utility line coupling protector that comprises a plurality of exterior radial grooves for providing a gripping surface for the tires of a vehicle;

a new and improved utility line coupling protector that includes a substantially hollow channel traversing therethrough and, further, that includes utility line apertures penetrating the dome at radially opposite sides;

a new and improved utility line coupling protector having adjustable perforated aperture adapter caps wherein the size of the openings therethrough may be adjusted by removing a portion of the adapter to ensure a snug and water resistant fit against various sized utility lines;

a new and improved utility line coupling protector that provides coupling stop means for preventing excessive horizontal movement of the utility line coupling within the dome, and for further preventing the coupling from being inadvertently withdrawn or removed from the dome;

a new and improved utility line coupling protector having coupling securing washers that may be placed in one of a plurality of ways for preventing horizontal movement and accidental disconnection of the coupling;

a new and improved utility line coupling protector optionally having a plurality of preferably pyramidal-shaped projections which extend downwardly from the bottom of the base for engaging the ground surface to prevent slippage of the device when it is driven over;

a new and improved utility line coupling protector having a plurality of through-holes for further securing the device into position upon the ground by nails, stakes, or the like;

a new and improved utility line coupling protector having easy access through the bottom of the device;

a new and improved utility line coupling protector that is fluid and debris-resistant to prevent water or other deleterious materials from entering the interior portion of the device;

a new and improved utility line coupling protector that may be provided in a highly visible color and, additionally, with light reflective means, in order to provide enhanced visibility of the device; and, a new and improved utility line coupling protector that may be easily manufactured and maintained.

These and other objects, features, and advantages of the present invention will become more apparent to one skilled in the art by reference to the following detailed description of the preferred and alternate embodiments, the appended claims, and the accompanying drawings.

BRIEF DESCRIPTION OF THE SEVERAL FIGURES

The present invention will be better understood by reading the Detailed Description of the Preferred Embodiment with reference to the accompanying drawing Figures, in which like reference numerals denote similar structure and refer to like elements throughout, and in which:

FIG. 1 is a perspective view of the utility line coupling protector according to a preferred embodiment of the present invention;

FIG. 2 is a sectional side view of the utility line coupling protector according to a preferred embodiment of the present invention;

FIG. 3 is a side and partial cutaway view of the utility line coupling protector according to a preferred embodiment of the present invention;

FIG. 4 is a bottom and partial cutaway view of the utility line coupling protector according to a preferred embodiment of the present invention;

FIG. 5 is a perspective view of the bottom cover of the utility line coupling protector according to a preferred embodiment of the present invention;

FIG. 6 is a perspective view of the single and double coupling securing washer of the utility line coupling protector according to a preferred embodiment of the present invention; and, FIG. 7 is a sectional side view of the adjustable aperture adapter cap of the utility line coupling protector according to a preferred embodiment of the present invention.

DETAILED DESCRIPTION OF THE PREFERRED EMBODIMENT

In describing the preferred and alternate embodiments of the present invention illustrated in the several Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Referring now to the FIGS. 1–4, device 10 is a utility line coupling protector according to a preferred embodiment of the present invention. Device 10 generally comprises dome 20, base 30, and bottom cover 60. More specifically, in the preferred embodiment, dome 20 comprises a rigid dome-shaped outer portion having first aperture 26 and second aperture 27 formed into and penetrating dome 20 at radially opposite sides (180 degrees apart) and proximate to lower edge 21. Between first and second apertures 26, 27, and traversing through dome 20, is a substantially hollow coupling channel section 50. As more fully described below, first and second apertures 26, 27 serve as openings for the insertion and removal of utility lines such as hoses, extension cords, and the like, and as such, are dimensioned for receiving same. Coupling channel section 50 serves to house and protect one or more utility line couplings placed by a user therein.

Because dome 20 is intended to be driven over by a vehicle without crushing, dome 20 is fabricated of any of a variety of high-strength, durable, crush-resistant materials, such as dense plastic, concrete, metal, or the like, as the needs of the user may dictate. In order to provide a gripping means to the exterior of dome 20 to better assist the rolling of vehicle tires over dome 20, a plurality of vertically-spaced-apart radial grooves 22 are formed on the exterior of dome 20, preferably such that the entire exterior surface of dome 20 consists of alternating radial grooves 22 and radial teeth 23. As a vehicle tire contacts dome 20, radial teeth 23 are engaged by the tire; thus, preventing the slipping of the tire as it rolls over dome 20.

Preferably attached to, or integrally formed with, lower edge 21 of dome 20 is base 30. Base 30 is preferably a circular-shaped member having an upper surface and a bottom surface. The outer diameter of base 30 may be larger than the outer diameter of dome 20 at lower edge 21; thus, in such configuration, forming a flange area 33 that circumscribes lower edge 21 of dome 20. Base 30 assists in stabilizing device 10 during use and, thus, the outer diameter of base 30 may be increased or decreased to create a wider or narrower flange area 33 as may be needed by the user with consideration to various sized domes, various underlying surfaces, and various sized and weighted utility lines with which device 10 is intended to be used.

Optionally, a plurality of, preferably, pyramid-shaped projections 34 extend downwardly from the bottom surface of base 30 to provide a means for securing device 10 into position with respect to the ground. Pyramid-shaped projections 34 engage the ground or other underlying surface; thus, gripping the surface to prevent the movement of device 10 when a vehicle is driven over the device or when device 10 is inadvertently contacted. Of course, projections 34 may be formed in any known shape that would provide a penetrating engagement with the underlying surface, or that would tend to increase the frictional contact with the underlying surface, in order to limit the movement of device 10 relative to the underlying surface.

As a further means for securing device 10 into a removably fixed position relative to the underlying surface, through-holes 32 are preferably formed on flange area 33 of base 30 at radially opposite positions. Nails, stakes, or the like, may be driven through the through-holes 32 and into the underlying surface in order to removably fix the position of device 10. Additional through-holes may be formed along flange area 33 of base 30 as may be needed or desired by the user to adequately secure device 10 to the ground. Alternatively, or additionally, device 10 may be weighted to further secure device 10 into the desired location.

As best seen with reference to FIG. 4, an elongated access area 65 is cutaway or formed through base 30, generally at the center of base 30 and extending substantially the length between first aperture 26 and second aperture 27. Access area 65 provides clearance to the internal portion of dome 20, and, thus, to coupling channel section 50. As such, the dimensions of access area 65 may be varied to provide adequate clearance for various sized and shaped coupling channel sections 50.

To provide a means for removably enclosing access area 65, bottom cover 60 is provided. Bottom cover 60, preferably, is dimensioned for slidably engaging within access area 65. Bottom cover 60 generally comprises two vertically juxtaposed plates 62, 64, shaped to conform to access area 65, wherein plate 64 is slightly smaller than plate 62 thereby forming lip 63. Alternatively, bottom cover 60 may be formed from a single piece of material, wherein lip 63 is formed by cutting a flange around the perimeter of bottom cover 60 or wherein bottom cover 60 is molded to form the above-described shape.

Plate 64 is dimensioned to frictionally engage with surface 68 of base 30, and plate 62 is dimensioned to snugly engage with surface 66 of base 30. Surface 66 has a depth approximately equal to the height of plate 62 such that when bottom cover 60 is engaged with base 30, bottom cover 60 is substantially flush with bottom surface of base 30. Additionally, the engagement of bottom cover 60 with base 30 is snug enough to ensure a fluid resistant closure.

Thus provided, the purpose of the bottom cover is to shield the internal portion of the dome from deleterious fluids, rocks, pebbles, grass, and the like.

It is noted that bottom cover 60 may take alternative forms without departing from either the scope or spirit of the present invention. For example, bottom cover 60 may be provided as a substantially round member intended to cover the entire bottom surface of base 30.

To provide means for preventing excessive horizontal movement of the utility line coupling within dome 20, and for further preventing the coupling from being inadvertently withdrawn or removed from the dome 20, first and second coupling stops 71, 73 are provided within coupling channel section 50 and proximate to respective first and second apertures 26, 27. As best seen with reference to FIGS. 2 and 4, coupling stops 71, 73 comprise, generally, inverted U-shaped structures which may be integrally formed with dome 20 and coupling channel section 50. Coupling stops 71, 73 depend downwardly and about coupling channel section 50 proximate first and second apertures 26, 27, and may be slanted toward the center of dome 20, in order to adequately capture a utility line coupling within the channel section 50 and to prevent unintentional extraction from the dome 20.

Coupling channel section 50 further comprises a plurality of first ways 51, a plurality of second ways 52 and a plurality of washers 54. Preferably, first ways 51 comprise a plurality of inverted U-shaped channels formed on the inside of dome 20 in the coupling channel section 50 and are preferably spaced horizontally apart along a horizontal line from approximately the center of dome 20 to approximately first aperture 26. Preferably, second ways 52 are also a plurality of inverted U-shaped channels formed on the inside of dome 20 in the coupling channel section 50 and are preferably spaced horizontally apart along a horizontal line from approximately the center of dome 20 to approximately second aperture 27. First and second ways 51, 52 are dimensioned for slidably and snugly receiving any of a variety of washers 54, 56 of the types best understood with reference to FIG. 6. While ways 51, 52 are shown in the Figures in a substantially vertical configuration, it will be appreciated that they may be slanted with respect to the coupling channel section 50 without departing from the present invention.

With continuing reference to FIG. 6, washers 54 are preferably inverted U-shaped members, of metal, dense plastic, or the like, having an opening 55 smaller than the size of the coupling 120 of the utility line 100 to be protected, yet larger than the utility line 100 itself. In use, preferably one washer 54 is slid and secured into one of the plurality of ways 51, and another similar washer 54 is slid and secured into one of the plurality of ways 52, wherein each washer 54 is positioned in close proximity to coupling 120. In this fashion, the horizontal movement of coupling 120 is, thereby, prevented or limited in order to prevent the unintended disconnection of utility line 100. Because the size of couplings 120 will vary depending on the type and load of utility line 100 to be protected, washers 54 may be positioned at the appropriate ways 51, 52 that best secure the respective couplings 120 in the engaged position.

Because device 10 is designed such that more than one coupling 120 from separate utility lines 100, including splitter couplings, may be protected by device 10, multiple opening washers, such as dual washer 56, may be provided. Dual washer 56 has two openings 57, 58 for securing two couplings 120, or the two-coupling side of a splitter coupling, or for ensuring adequate spacing and arrangement of more than one utility line in the coupling channel section 50. Dual washer 56, for example, may advantageously be used with dual utility line devices, such as cutting torches and the like. It also should be noted that any number of couplings 120 may be protected by device 10, as size permits, and, thus, washers 56 may have any number of openings 57, 58.

Additionally, the size of openings 55, 57, 58 of each washer 54 or 56, respectively, may also be provided to accommodate various sized utility lines 100 and couplings 120. In such configuration, a plurality of partially frangible, severed, or perforated, nested, inverted U-shaped portions may be provided at various positions along the central vertical axis of the washers 54, 56 such that, depending on the diameter of utility line 100, the appropriate perforated portion may be broken away and removed; thereby, leaving an opening having an equal or slightly larger width than the diameter of utility line 100.

As best seen with reference to FIGS. 2, 3, and 7, to protect coupling 120 from exposure to deleterious fluids and debris, coupling channel section 50 of dome 20 is designed to be fluid and debris resistant. In addition to the fluid and debris-resistant fit of bottom cover 60, adjustable aperture adapter caps 40 may be provided. Adjustable aperture adapter caps 40 preferably are manufactured from a resilient fluid resistant material, such as rubber or the like, and are formed to conform to the surface shape of dome 20. Adjustable aperture adapter caps 40 are dimensioned to be received within either first aperture 26 or second aperture 27, and can be adjusted as described below to snugly fit around utility line 100. As best seen with reference to FIG. 2, aperture adapter caps 40 may be securely pressed into relief bores 29 formed adjacent apertures 26, 27. So installed, the adjustable aperture adapter caps 40 deter the entry of water, other liquids, and foreign objects into coupling channel section 50 of dome 20.

Adjustable aperture adapter caps 40 reduce the size of the respective aperture 26, 27 to a relatively small inverted U-shaped opening. A plurality of partially frangible, severed, or perforated inverted U-shaped portions 42, 44, 46, 48 are provided at various positions along the central vertical diameter of the adjustable aperture adapter caps 40 such that, depending on the diameter of utility line 100, the appropriate perforated portion may be torn away and removed; thereby, leaving an opening having an equal or slightly smaller width than the diameter of utility line 100. Adjustable aperture adapter cap 40, therefore, rests snugly against the utility line and thereby creates a fluid and object-resistant fit. It should be noted that any number of perforations in any of a variety of shapes may be formed into adjustable aperture adapter caps 40 such that a multitude of utility lines 100 having various shapes and sizes may be accomodated. Adjustable aperture adapter caps 40, of course, may be integrally formed with dome 20.

The dome 20 may be provided in a highly visible color, such as brilliant orange or yellow. Such bright coloration may provide enhanced visibility of device 10 to a vehicle or machinery driver during the day. Additionally, dome 20 may be provided with light reflective means, such as reflective paints, stickers, tapes, or other reflective devices, in order to provide enhanced visibility of device 10 to a vehicle or machinery driver during the night or during adverse weather conditions.

Having thus described the main features of the invention, its manner of intended use is now more fully discussed. A user of device 10 inserts male and female utility line couplings 122, 124 into the opposing apertures 26, 27 of the device 10. The utility lines 100 are extended sufficiently within and through the dome 20 to clear the base 30 of the device by flexing the lines 100 outwardly past each coupling stop 71, 73, past each washer 54 or 56, and out through access area 65. Then, the couplings 122, 124 are joined together. The lines 100 are then withdrawn such that the joined coupling 120 may be inserted into the coupling channel section 50 between coupling stops 71, 73, and further between the respective washers 54 or 56. In such assemblage, the washers 54, 56 are adjusted to rest against, or in close proximity to, the coupling 120; thus, preventing or limiting any horizontal movement of the coupling 120 and inhibiting accidental disconnection of the joined lines 100. Device 10 is then fitted with adjustable aperture adapter caps 40 and bottom cover 60. The device is placed upon the ground and pressed into place in order to firmly engage projections 34 with the ground. Nails, stakes, or the like, may be driven through the through-holes 32, 33 and into the ground in order to firmly fix the position of device 10.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An apparatus for protecting a utility line coupling from a load exerted by a moving vehicle, wherein the utility line is placed on top of the ground or other underlying surface, and wherein the coupling comprises at least one male connector and one female connector, comprising:

an enclosure having a dome-shaped top surface and a flat bottom surface;

said enclosure having a first aperture, a second aperture, an internal coupling channel, and an opening for access to said internal coupling channel;

said first and second apertures being dimensioned for receiving at least one of the female and male connectors; and, said internal coupling channel dimensioned for receiving the coupling;

wherein the female connector end of a utility line is inserted through said first aperture and into said internal coupling channel of said enclosure, and the male connector end of a utility line is inserted through said second aperture and into said internal coupling channel of said enclosure, and wherein the male connector is engaged with the female connector for subsequent positioning within said coupling channel in said enclosure, such that when said enclosure is subjected to the load of the moving vehicle, said enclosure protects the coupling from damage.

2. The apparatus of claim 1, further comprising a base having a top surface and a bottom surface, said bottom surface of said base for resting on top of the ground or other underlying surface, and said top surface for engaging the flat bottom surface of the enclosure.

3. The apparatus of claim 2, wherein said base is circular shaped.

4. The apparatus of claim 3, wherein the diameter of said base is greater than the diameter of said flat bottom surface of said enclosure thereby forming a flange area around the perimeter of said flat bottom surface of said enclosure.

5. The apparatus of claim 4, further comprising at least one through-hole on said flange area of said base for securing said apparatus to the ground or other underlying surface.

6. The apparatus of claim 1, further comprising at least one radial groove formed on said enclosure, wherein when the vehicle travels across said enclosure, said groove assists in gripping said vehicle to prevent slippage.

7. The apparatus of claim 1, further comprising a plurality of projections extending downwardly from said enclosure.

8. The apparatus of claim 1, further comprising a plurality of ways formed in said enclosure proximate to said internal coupling channel, and at least one washer dimensioned for slidably engaging at least one of said plurality of ways proximate to the coupling, said washer having an opening therethrough, wherein said opening of said washer is large enough for receiving a utility line, yet is smaller than the size of the coupling; thus, limiting movement of the coupling within said enclosure.

9. The apparatus of claim 1, further comprising at least one aperture adapter cap carried within either of said first aperture or said second aperture, said aperture adapter cap comprising means for reducing the size of said first aperture or said second aperture in order to accommodate a utility line and to further deter entry of fluid and debris into the enclosure.

10. The apparatus of claim 9, wherein said means for reducing the size of said first or second aperture comprise at least one frangible region dividing at least a first portion and a second portion of said adapter cap, wherein at least said first portion may be separated from said second portion to create a second sized opening to accommodate variously sized utility lines and to further deter entry of fluid and debris into the enclosure.

11. The apparatus of claim 1 further comprising a bottom cover.

12. An apparatus for protecting a utility line coupling from a load exerted by a moving vehicle, wherein the utility line is placed on top of the ground or other underlying surface, and wherein the coupling comprises at least one male connector and one female connector, comprising:

a base having a top surface and a bottom surface, said bottom surface of said base for resting on top of the ground or other underlying surface; and, a dome-shaped enclosure having a top surface and a bottom surface, said bottom surface of said dome-shaped enclosure carried by said top surface of said base, said dome-shaped enclosure having a first aperture, a second aperture, an internal coupling channel comprising an internal cavity, and an opening for access to said internal coupling channel, said first and second apertures dimensioned for receiving at least one of the female and male connectors, said internal cavity dimensioned for receiving the coupling;

wherein the female connector end of a utility line is inserted through said first aperture and into said internal coupling channel of said dome-shaped enclosure and the male connector end of a utility line is inserted through said second aperture and into said internal coupling channel of said dome-shaped enclosure, and wherein the male connector is engaged with the female connector for subsequent positioning within said coupling channel in said dome-shaped enclosure, such that when said dome-shaped enclosure is subjected to the load of the moving vehicle, said dome-shaped enclosure protects the coupling from damage.

13. The apparatus of claim 12, wherein the base is circular.

14. The apparatus of claim 13, wherein the diameter of said circular-shaped base is greater than the diameter of said bottom surface of said dome-shaped enclosure; thereby, forming a flange area around the perimeter of said bottom surface of said dome-shaped enclosure.

15. The apparatus of claim 14, further comprising at least one through-hole on said flange area of said circular-shaped base for securing said apparatus to the ground or other underlying surface.

16. The apparatus of claim 12, further comprising at least one radial groove formed on said dome-shaped enclosure, wherein when the vehicle travels across said dome-shaped enclosure, said groove assists in gripping said vehicle to prevent slippage.

17. The apparatus of claim 12, further comprising a plurality of projections extending downwardly from said bottom surface of said base.

18. The apparatus of claim 12, further comprising a plurality of ways formed in said dome-shaped enclosure proximate to said internal coupling channel, and at least one washer dimensioned for slidably engaging at least one of said plurality of ways proximate to the coupling, said washer having an opening therethrough, wherein said opening of said washer is large enough for receiving a utility line, yet is smaller than the size of the coupling; thus, limiting movement of the coupling within said enclosure.

19. The apparatus of claim 12, further comprising at least one aperture adapter cap carried within either of said first aperture or said second aperture, said aperture adapter cap comprising means for reducing the size of said first aperture or said second aperture in order to accommodate a utility line and to further deter entry of fluid and debris into the enclosure.

20. The apparatus of claim 19, wherein said means for reducing the size of said first or second apertures comprise at least one frangible region dividing at least a first portion and a second portion of said adapter cap, wherein at least said first portion may be separated from said second portion to create a second sized opening to accommodate variously sized utility lines and to further deter entry of fluid and debris into the enclosure.

21. The apparatus of claim 12 further comprising a bottom cover.

22. An apparatus for protecting a utility line coupling from a load exerted by a moving vehicle, wherein the utility line is placed on top of the ground or other underlying surface, and wherein the coupling comprises at least one male connector and one female connector, comprising:

a circular-shaped base having a top surface and a bottom surface, said bottom surface of said circular-shaped base for resting on top of the ground or other underlying surface;

a dome-shaped enclosure having a top surface and a bottom surface, said bottom surface of said dome-shaped enclosure carried by said top surface of said circular-shaped base, said dome-shaped enclosure having a first aperture, a second aperture, an internal coupling channel comprising an internal cavity, and an opening for access to said internal coupling channel, said first aperture and said second aperture dimensioned for receiving at least one of the female and male connectors, said internal coupling channel dimensioned for receiving the coupling;

means carried within said coupling channel for limiting horizontal movement of a coupling;

a first aperture adapter cap carried within said first aperture, said first aperture adapter cap having at least one frangible region dividing at least a first portion and a second portion thereof, said first portion and said second portion reducing the size of said first aperture, wherein at least said first portion may be separated from said second portion to create a second sized opening to accommodate various sized utility lines and to further deter entry of fluid and debris into the enclosure; and, a second aperture adapter cap carried within said second aperture, said second aperture adapter cap having at least one frangible region dividing at least a first portion and a second portion thereof, said first portion and said second portion reducing the size of said second aperture, wherein at least said first portion may be separated from said second portion to create a second sized opening to accommodate various sized utility lines and to further deter entry of fluid and debris into the enclosure;

wherein the female connector end of the utility line is inserted through said first aperture adapter cap and into said internal cavity of said dome-shaped enclosure and the male connector end of the utility line is inserted through said second aperture adapter cap and into said internal cavity of said dome-shaped enclosure, and wherein the male connector is engaged with the female connector for subsequent positioning within said coupling channel in said dome-shaped enclosure, such that when said dome-shaped enclosure is subjected to the load of the moving vehicle, said dome-shaped enclosure protects the coupling from damage.

23. The apparatus of claim 22, wherein the diameter of said circular-shaped base is greater than the diameter of said bottom surface of said dome-shaped enclosure thereby forming a flange area around the perimeter of said bottom surface of said dome-shaped enclosure.

24. The apparatus of claim 23, further comprising at least one through-hole on said flange area of said circular-shaped base for securing said apparatus to the ground or other underlying surface.

25. The apparatus of claim 22, further comprising at least one radial groove formed on said dome-shaped enclosure, wherein when the vehicle travels across said dome-shaped enclosure, said groove assists in gripping said vehicle to prevent slippage. forming a flange area around the perimeter of said bottom surface of said dome-shaped enclosure.

26. The apparatus of claim 22, further comprising a plurality of projections extending downwardly from said bottom surface of said circular-shaped base.

27. The apparatus of claim 22, wherein said means carried within said coupling channel for limiting horizontal movement of a coupling further comprises a plurality of ways formed in said dome-shaped enclosure proximate to said internal coupling channel, and at least one washer dimensioned for slidably engaging at least one of said plurality of ways proximate to the coupling, said washer having an opening therethrough, wherein said opening of said washer is large enough for receiving a utility line, yet is smaller than the size of the coupling; thus, limiting movement of the coupling.

28. The apparatus of claim 22, wherein said means carried within said coupling channel for limiting horizontal movement of a coupling further comprises at least one coupling stop.

29. The apparatus of claim 22 further comprising a bottom cover.

* * * * *